United States Patent
Yasue et al.

(10) Patent No.: US 7,139,147 B2
(45) Date of Patent: Nov. 21, 2006

(54) APPARATUS AND METHOD FOR DRIVE CONTROL, AND COMPUTER PRODUCT

(75) Inventors: Mitsuru Yasue, Kawasaki (JP); Kinya Saito, Kawasaki (JP); Kenichi Utsumi, Kawasaki (JP); Reisuke Nakagawa, Kawasaki (JP); Hitomi Akiyama, Kawasaki (JP); Ichirou Sakuma, Kawasaki (JP); Hiroyasu Inagaki, Kawasaki (JP); Yoshiharu Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/188,689

(22) Filed: Jul. 25, 2005

(65) Prior Publication Data

US 2006/0215305 A1    Sep. 28, 2006

(30) Foreign Application Priority Data

Mar. 25, 2005   (JP)   ............................. 2005-089813

(51) Int. Cl.
*G11B 17/00*   (2006.01)
*G11B 5/02*   (2006.01)

(52) U.S. Cl. .......................................... 360/71; 360/27
(58) Field of Classification Search ................... 360/71
See application file for complete search history.

(56) References Cited

U.S. PATENT DOCUMENTS 7,003,674 B1 *   2/2006   Hamlin ...................... 713/193
2005/0262361 A1 *  11/2005  Thibadeau .................. 713/193

FOREIGN PATENT DOCUMENTS

JP         58-108571      6/1983

* cited by examiner

*Primary Examiner*—Wayne Young
*Assistant Examiner*—Jason Olson
(74) *Attorney, Agent, or Firm*—Greer, Burns & Crain, Ltd.

(57) ABSTRACT

A drive control apparatus receives an instruction from an upper unit, to mount a predetermined medium onto a predetermined drive unit. If a combination of the predetermined medium and the predetermined drive unit is determined as inappropriate, the drive control unit replies to the upper unit that the predetermined drive unit cannot be used. A combination of a medium and a drive is appropriate if both, the medium and the drive are suitable for any one of encrypted and unencrypted data.

6 Claims, 7 Drawing Sheets

FIG.3

| MEDIUM IDENTIFICATION INFORMATION (VOLUME LABEL) | PRESENCE OF ENCRYPTION |
|---|---|
| A * * * | YES |
| ... | ... |

FIG.4

| DRIVE UNIT NUMBER | ATTRIBUTE |
|---|---|
| 1 | FOR ENCRYPTED DATA |
| 2 | FOR ENCRYPTED DATA |
| 3 | FOR UNENCRYPTED DATA |
| 4 | FOR UNENCRYPTED DATA |

FIG.6

| MEDIUM IDENTIFICATION INFORMATION (MEDIUM STORAGE POSITION: COLUMN) | PRESENCE OF ENCRYPTION |
|---|---|
| COLUMN 1 TO 4 | YES |
| COLUMN 5 TO 8 | NO |
| COLUMN 9 TO 14 | NO |
| ⋮ | ⋮ |

APPARATUS AND METHOD FOR DRIVE CONTROL, AND COMPUTER PRODUCT

BACKGROUND OF THE INVENTION

1. Field of the Invention

The present invention relates to an apparatus and a method for drive control, and computer product for mounting a predetermined medium onto a predetermined drive unit.

2. Description of the Related Art

Conventionally, a so-called tape library device that includes plural mediums, plural drive units, and a drive control apparatus receives an instruction from an upper unit, and mounts a predetermine medium onto a predetermined drive unit (see Japanese Patent Application Laid-open No. S58-108571).

Specifically, in reading data from or writing data to a medium stored in the tape library device, the upper device transmits, to the drive control apparatus, an instruction containing information of the specified medium and a specified drive unit onto which the medium is to be mounted. Upon receiving this instruction, the drive control apparatus confirms that the drive unit specified in the instruction from the upper unit is not being used. If the specified drive unit is not being used, the drive control apparatus transmits a signal to a robot to mount the specified medium onto the specified drive unit, based on the instruction from the upper unit.

On the other hand, if the specified drive unit is being used, the drive control apparatus replies to the upper unit that the drive unit is being used. Upon receiving this reply, the upper unit selects any other drive unit, different from the drive unit specified in the preceding instruction, and transmits an instruction containing information similar to the above, to the drive control apparatus. This information exchange between the upper unit and the drive control apparatus is repeatedly carried out until the specified medium is mounted onto the specified drive unit.

The media stored in the tape library device include media in which encrypted data are stored, and media in which unencrypted data are stored. The drive unit as one of the units that configure the tape library device includes drive units for encrypted data corresponding to the media in which the encrypted data are stored, and drive units for encrypted data corresponding to the media in which the unencrypted data are stored.

While configuring a tape library device to including both types of the drive units, the following problem occurs. That is, the drive control apparatus mounts the medium storing encrypted data onto the drive unit for unencrypted data, or mounts the medium storing unencrypted data onto the drive unit for encrypted data. This problem occurs because the drive control apparatus faithfully executes the instruction from the upper unit.

Therefore, at present, there is no other means to configure physically-different tape libraries, i.e., a tape library in which only drive units for encrypted data are present, and a tape library in which only drive units for unencrypted data are present. Consequently, configuring physically-different tape libraries has a problem in that cost performance and compactness of peripheral units of a computer cannot be achieved.

SUMMARY OF THE INVENTION

It is an object of the present invention to at least solve the problems in the conventional technology.

According to an aspect of the present invention, a drive control apparatus that mounts a predetermined medium out of a plurality of media onto a predetermined drive unit out of a plurality of drive units includes a receiving unit that receives, from an upper unit, an instruction to mount the predetermined medium onto the predetermined drive unit; a medium information storage unit that stores information indicating whether data stored in each of the media is encrypted; a drive information storage unit that stores information indicating whether each of the drive units corresponds to encrypted data; a match determining unit that determines whether a combination of a drive unit and a medium in an instruction from the upper unit is appropriate, where a combination of the drive unit and the medium both corresponding to encrypted data, and a combination of the drive unit and the medium both corresponding to unencrypted data are determined as appropriate; and a replying unit that replies to the upper unit that the predetermined drive unit cannot be used, if the match determining unit determines that the combination is inappropriate.

According to another aspect of the present invention, a drive control method for mounting a predetermined medium out of a plurality of media onto a predetermined drive unit out of a plurality of drive units, includes receiving, from an upper unit, an instruction to mount the predetermined medium onto the predetermined drive unit; storing information indicating whether data stored in the medium is encrypted; storing information indicating whether the drive unit corresponds to encrypted data; determining whether a combination of a drive unit and a medium in an instruction from the upper unit is appropriate, where a combination of the drive unit and the medium both corresponding to encrypted data is determined as appropriate, and a combination of the drive unit and the medium both corresponding to unencrypted data is determined as appropriate; and replying to the upper unit that the predetermined drive unit cannot be used, if it is determined at the determining that the combination is inappropriate.

According to still another aspect of the present invention, a computer-readable recording medium stores therein a computer program for mounting a predetermined medium out of a plurality of media onto a predetermined drive unit out of a plurality of drive units, the computer program including instructions, which when executed, cause a computer to execute the above method.

According to still another aspect of the present invention, a server device includes a receiving unit that receives, from an upper unit, an instruction to mount a predetermined medium out of a plurality of media onto a predetermined drive unit out of a plurality of drive units; a relaying unit that relays the instruction to a drive control apparatus; a medium information storage unit that stores information indicating whether data stored in each of the media is encrypted; a drive information storage unit that stores information indicating whether each of the drive units corresponds to encrypted data; a match determining unit that determines whether a combination of a drive unit and a medium in an instruction from the upper unit is appropriate, where a combination of the drive unit and the medium both corresponding to encrypted data, and a combination of the drive unit and the medium both corresponding to unencrypted data are determined as appropriate; a replying unit that replies to the upper unit that the predetermined drive unit cannot be used, if the match determining unit determines that the combination is inappropriate; and an instruction transmitting unit that transmits the instruction to the drive control apparatus, if the match determining unit determines that the combination is appropriate.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table of information stored in a medium information storage unit according to the first embodiment;

FIG. 4 is a table of information stored in a drive information storage unit according to the first embodiment;

FIG. 6 is a table of information stored in a medium information storage unit according to a second embodiment;

DETAILED DESCRIPTION OF THE PREFERRED EMBODIMENTS

Exemplary embodiments of the present invention will be explained below in detail with reference to the accompanying drawings. A drive control apparatus in a tape library device according to a first embodiment of the present invention is explained first, followed by explanations of other operations according to a second embodiment of the invention.

Figure 1:
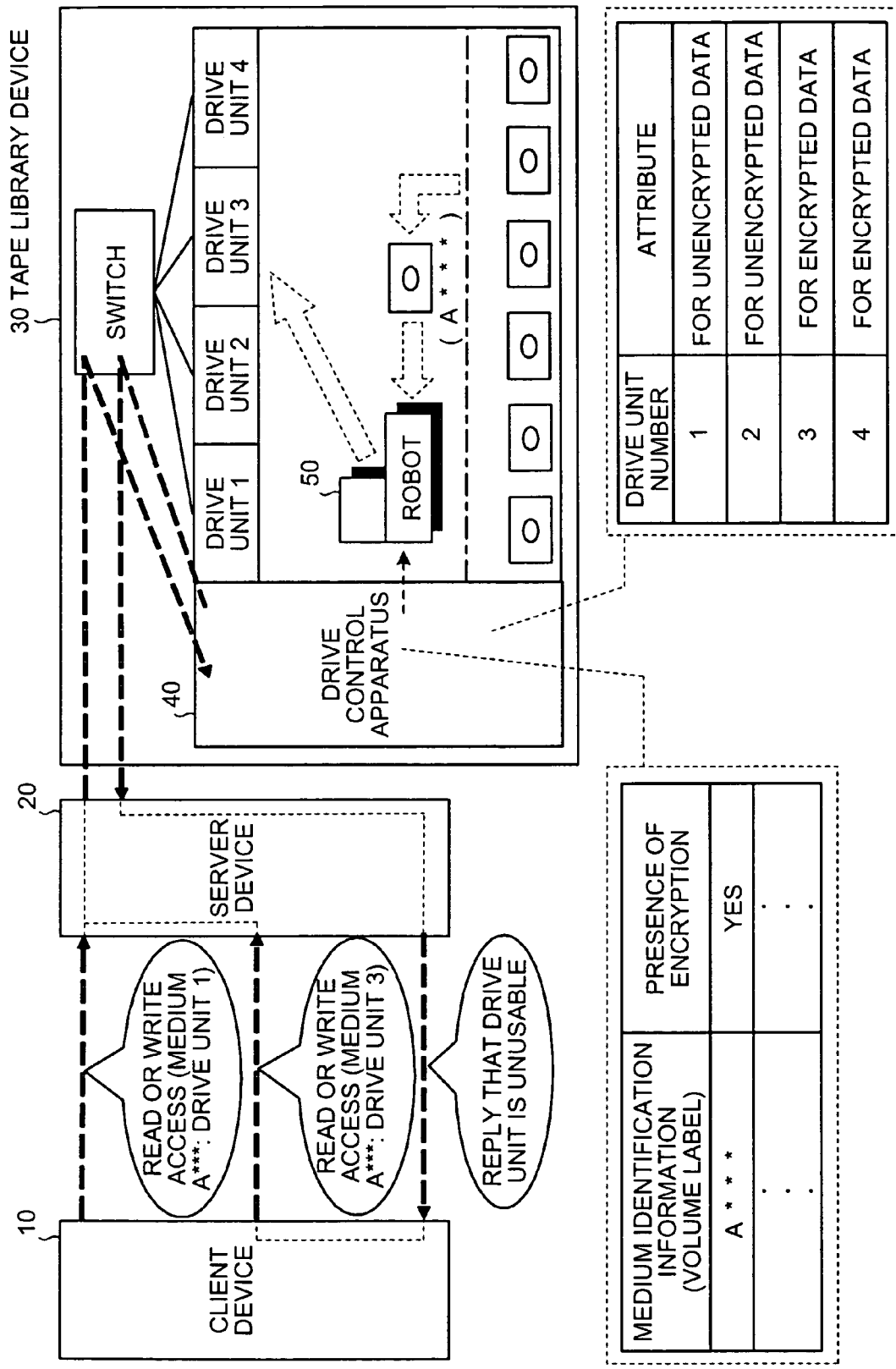
FIG. 1 is a general overview of a drive control apparatus according to a first embodiment of the present invention.

The outline and characteristics of the drive control apparatus according to the first embodiment are explained first with reference to FIG. 1. FIG. 1 is a general overview of the drive control apparatus according to the first embodiment. As shown in FIG. 1, a drive control apparatus 40 is included in a tape library device 30, together with plural media and plural drive units.

The tape library device 30 receives an instruction, containing information (for example, medium A***: drive unit 1) for assigning a medium and a drive unit onto which the medium is to be mounted, from a client device 10 as an upper unit, via a server device 20. In this case, the instruction is directly sent to the drive control apparatus 40.

Upon receiving this instruction, the drive control apparatus 40 confirms that the drive unit 1 specified by the client device 10 is in an unused state. If it is confirmed that the drive unit 1 is not being used, the drive control apparatus 40 transmits a signal to a robot 50 to mount the medium (volume label: A***) onto the drive unit 1. On the other hand, if it is confirmed that the drive unit 1 is being used, the drive control apparatus 40 replies to the client device 10, via the server device 20, that the specified drive unit 1 cannot be used.

As described above, the drive control apparatus 40 confirms that the drive unit is not being used. Furthermore, the drive control apparatus 40 determines whether the combination of the medium and the drive unit onto which the medium is to be mounted specified is appropriate. This arrangement makes it possible to provide a tape library device in which both, the drive units for encrypted data and the drive units for unencrypted data, are present.

This main characteristic is briefly explained below. As shown in FIG. 1, the drive control apparatus 40 has information about whether encrypted data is stored in a medium, for each of the media in the tape library device 30, and information about whether a drive unit corresponds to encrypted data, for each of the plural drive units that are provided in the tape library device. When it is confirmed that the drive unit 1 specified by the client device 10 is not being used, the drive control apparatus 40 determines whether the combination of the medium (the volume label: A***) and the drive unit 1 is appropriate, based on this information.

A method of how the drive control apparatus 40 determines whether the combination of the medium and the drive unit is appropriate is briefly explained below. When a drive unit for encrypted data is assigned to a medium that stores encrypted data, and also when a drive unit for unencrypted data is assigned to a medium that stores unencrypted data, the drive control apparatus 40 determines that the combination of the medium and the drive unit is appropriate. When a drive unit for unencrypted data is assigned to a medium that stores encrypted data, and also when a drive unit for encrypted data is assigned to a medium that stores unencrypted data, the drive control apparatus 40 determines that the combination of the medium and the drive unit is not appropriate.

In FIG. 1, the drive control apparatus 40 determines that the combination of the medium (volume label: A***) that stores encrypted data and the drive unit 1 corresponding to unencrypted data is inappropriate. Therefore, the drive control apparatus 40 replies to the client device 10 that the specified drive unit 1 is unusable.

Upon receiving this reply, as shown in FIG. 1, the client device 10 selects another drive unit 3, different from the drive unit 1, and transmits an instruction containing information (medium A***: the drive unit 3) similar to the above, to the tape library device 30 via the server device 20 again.

Upon receiving this instruction, the drive control apparatus 40 confirms that the drive unit 3 specified by the client device 10 is not being used, in a similar manner to the above. If it is confirmed that the drive unit 3 is not being used, the drive control apparatus 40 confirms whether a combination of the medium (volume label: A*) and the drive unit 3 is appropriate. In FIG. 1, the drive control apparatus 40 determines that the combination of the medium (volume label: A*) that stores encrypted data and the drive unit 3 corresponding to encrypted data is appropriate. Therefore, the drive control apparatus 40 transmits a signal to the robot 50 to mount the medium (volume label: A***) onto the drive unit 3.

The drive control apparatus 40 repeatedly replies to the client device 10 as an upper unit that the drive unit is unusable until when the drive control apparatus 40 receives the instruction to assign a drive unit for encrypted data to a medium storing encrypted data, or the instruction to assign a drive unit for unencrypted data to a medium storing unencrypted data. Therefore, the tape library device 30 can mount an appropriate medium onto an appropriate drive unit, even when both drive units for encrypted data and drive units for unencrypted data are present.

In other words, based on the drive control apparatus 40, it is possible to realize a tape library device in which both, the drive units for encrypted data corresponding to media storing encrypted data, and the drive units for unencrypted data corresponding to media storing unencrypted data are present. The reply from the drive control apparatus 40 to the client device 10 that the specified drive unit cannot be used is the same as the signal that is conventionally sent from the drive control apparatus to the client device 10 when the drive unit specified by the client device 10 is being used. Therefore, the above effect can be obtained without modifying the configuration of the client device 10.

Figure 2:
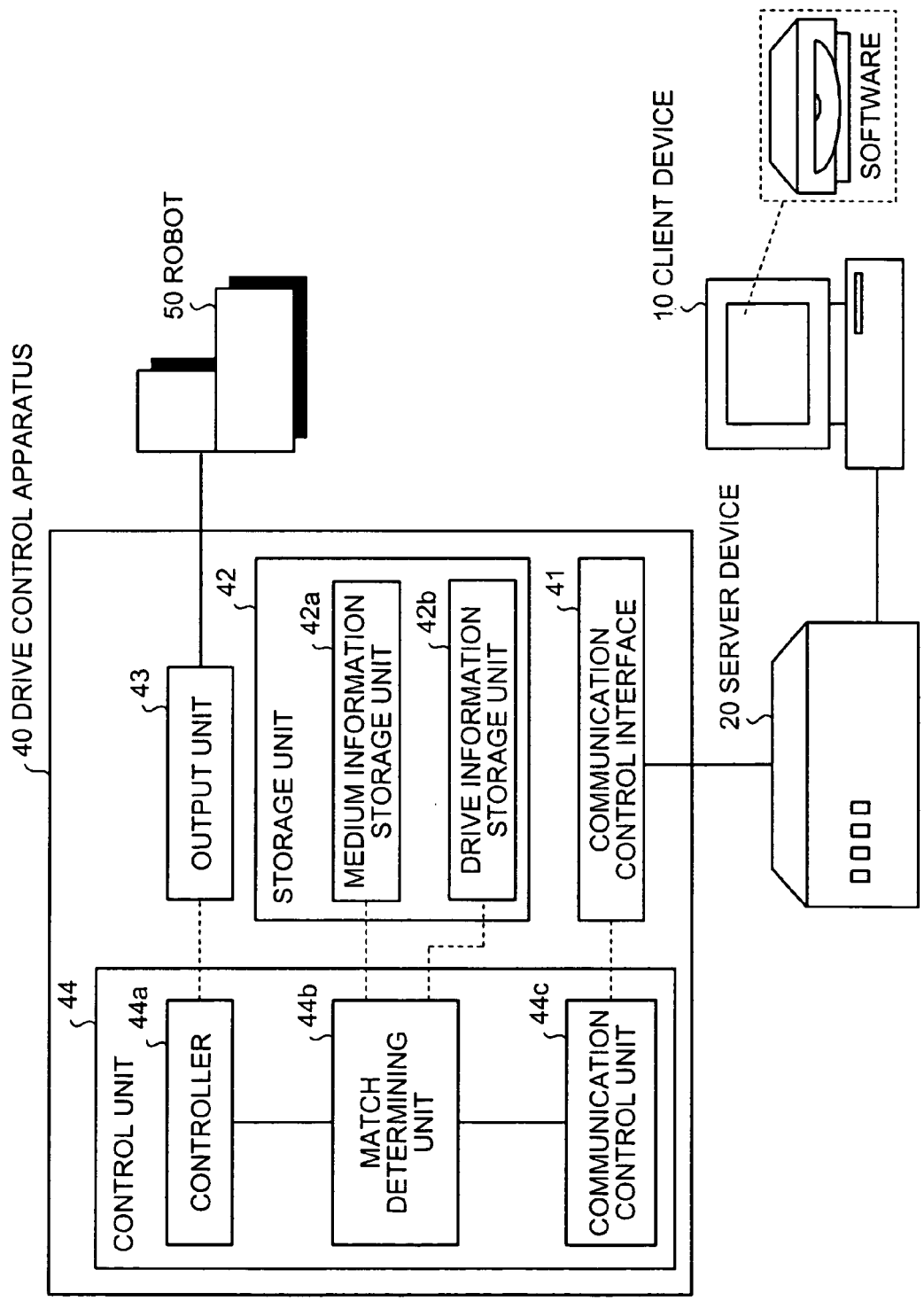
FIG. 2 is a block diagram of a configuration of the drive control apparatus according to the first embodiment.

A configuration of the drive control apparatus 40 in the tape library device 30 shown in FIG. 1 is explained below with reference to FIGS. 2 to 4. FIG. 2 is a block diagram of the configuration of the drive control apparatus 40 according to the first embodiment. FIG. 3 is a table of information stored in a medium information storage unit according to the first embodiment. FIG. 4 is a table of information stored in a drive information storage unit according to the first embodiment. As shown in FIG. 2, the drive control apparatus 40 includes a communication control interface 41, a storage unit 42, an output unit 43, and a control unit 44.

The communication control interface 41 controls communication concerning various kinds of information exchanged between the drive control apparatus 40 and the server device 20. Specifically, the communication control interface 41 receives an instruction containing information for assigning a medium and a drive unit onto which the medium is to be mounted, from the client device 10 via the server device 20.

The storage unit 42 stores data and programs necessary for the control unit 44 to carry out various kinds of processes. Particularly, the storage unit 42 has a medium information storage unit 42a, and a drive information storage unit 42b that are closely related to the present invention. The medium information storage unit 42a corresponds to a "medium information storage unit", and the drive information storage unit 42b corresponds to a "drive information storage unit" in the appended claims, respectively.

In the storage unit 42, the medium information storage unit 42a stores various kinds of information concerning media stored in the tape library device 30. Specifically, as shown in FIG. 3, the medium information storage unit 42a stores medium identification information (such as a volume label) unique to each medium, in relation to information about whether this medium stores encrypted data (such as yes or no).

The drive information storage unit 42b stores various kinds of information concerning a drive unit. Specifically, as shown in FIG. 4, the drive information storage unit 42b stores a drive unit number unique to each drive unit, in relation to information about whether this drive unit corresponds to encrypted data.

The output unit 43 outputs various kinds of information. Specifically, the output unit 43 receives a signal, for controlling the robot 50, from a controller 44a, and outputs this information to the robot 50.

The control unit 44 has internal memories for storing predetermined control programs and programs that prescribe various process procedures, and executes various processes based on these programs. Particularly, as shown in FIG. 2, the control unit 44 includes the controller 44a, a match determining unit 44b, and a communication control unit 44c that are closely related to the present invention. The match determining unit 44b corresponds to a "match determining unit", and the communication control unit 44c corresponds to a "replying unit" in the appended claims, respectively.

In the control unit 44, the controller 44a controls the robot 50 that mounts a specified medium onto a specified drive unit, based on the instruction from the client device 10 (for example, software built in a computer) containing the information for assigning a medium and a drive unit onto which the medium is to be mounted. Specifically, upon receiving the signal from the match determining unit 44b, the controller 44a instructs the robot 50 to mount the specified medium onto the specified drive unit.

The match determining unit 44b determines whether the drive unit specified by the client device 10 is usable. "The drive unit is usable" means that the specified drive unit is not being used, and that the combination of the medium and the drive unit onto which the medium is mounted is appropriate. Specifically, the match determining unit 44b determines whether the drive unit, specified in the instruction the drive control apparatus 40 receives from the client device 10, is not being used. When the drive unit specified in the instruction from the client device 10 is not being used, the match determining unit 44b determines whether the combination of the medium specified in the instruction and the drive unit specified in the instruction is appropriate.

For example, if a drive unit for encrypted data is assigned to a medium storing encrypted data, or if a drive unit for unencrypted data is assigned to a medium storing unencrypted data, the match determining unit 44b determines that the combination of the medium and the drive unit is appropriate. On the other hand, if a drive unit for unencrypted data is assigned to a medium storing encrypted data, or if a drive unit for encrypted data is assigned to a medium storing unencrypted data, the match determining unit 44b determines that the combination of the medium and the drive unit is not appropriate.

The communication control unit 44c receives a signal from the match determining unit 44b, and transmits predetermined information to the client device 10 via the communication control interface 41. Specifically, if it is confirmed that the drive unit specified by the client device 10 is being used, or that the combination of the specified medium and the specified drive unit is not appropriate, the communication control unit 44c receives a signal from the match determining unit 44b, and replies to the client device 10 that the specified drive unit is unusable.

Figure 5:
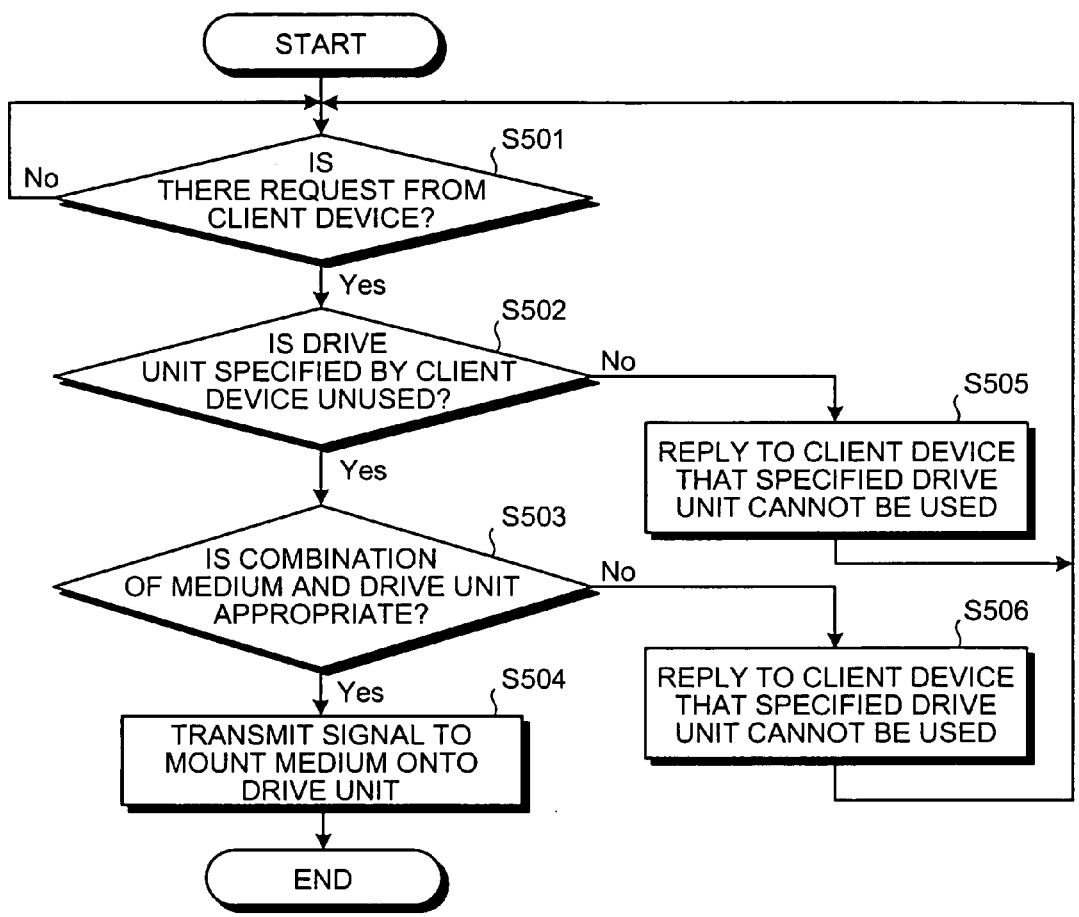
FIG. 5 is a flowchart of a match determination process carried out by the drive control apparatus according to the first embodiment.

The match determination process carried out by the drive control apparatus according to the first embodiment is explained below with reference to FIG. 5. FIG. 5 is a flowchart of the match determination process carried out by the drive control apparatus according to the first embodiment.

As shown in FIG. 5, when the match determining unit 44b receives a mount request from the client device 10, via the communication control unit 44c (Yes at step S501), the match determining unit 44b confirms that the specified drive unit is not being used, from the information for assigning the medium and the drive unit onto which the medium is to be mounted, contained in the instruction transmitted at the time of the mount request (step S502). If the drive unit is not being used (Yes at step S502), the match determining unit 44b determines whether the combination of the specified medium and the specified drive unit is appropriate (step S503).

If the combination of the medium and the drive unit is appropriate (for example, when a drive unit for encrypted data is assigned to a medium storing encrypted data, or when a drive unit for unencrypted data is assigned to a medium storing unencrypted data, the combination of the medium and the drive unit is determined as appropriate) (Yes at step S503), the match determining unit 44b transmits a signal to the controller 44a to mount the medium specified by the client device 10 onto the specified drive unit (step S504), and the match determination process ends.

At step S502, if the match determining unit 44b confirms that the drive unit specified by the client device 10 is being used (No at step S502), the communication control unit 44c receives a signal from the match determining unit 44b, and replies to the client device 10 that the specified drive unit is unusable (step S505), and the match determination process ends.

At step S503, if the match determining unit 44b determines that the combination of the medium and the drive unit is inappropriate (for example, when a drive unit for unencrypted data is assigned to a medium storing encrypted data, or when a drive unit for encrypted data is assigned to a medium storing unencrypted data, the combination of the medium and the drive unit is determined as inappropriate) (No at step S503), the communication control unit 44c receives a signal from the match determining unit 44b, and replies to the client device 10 that the specified drive unit is unusable (step S506), and the match determination process ends.

As described above, according to the first embodiment, the drive control apparatus 40 repeatedly replies to the client device 10 as an upper unit that the drive unit is unusable until when the drive control apparatus 40 receives the instruction to assign a drive unit for encrypted data to a medium storing encrypted data, or the instruction to assign a drive unit for unencrypted data to a medium storing unencrypted data. Therefore, the tape library device 30 can mount an appropriate medium onto an appropriate drive unit, even when both drive units for encrypted data and drive units for unencrypted data are present.

In other words, based on the drive control apparatus 40, it is possible to realize a tape library device in which both, drive units for encrypted data corresponding to media storing encrypted data, and drive units for unencrypted data corresponding to media storing unencrypted data are present. The reply from the drive control apparatus to the client device 10 that the specified drive unit cannot be used is the same as the signal that is sent from the conventional drive control apparatus to the client device 10 when the drive unit specified by the client device 10 is being used. Therefore, the above effect can be obtained without modifying the configuration of the client device 10.

According to the first embodiment, the drive control apparatus 40 stores information about whether encrypted data is stored in a medium, for each of the plural media. Therefore, it is possible to flexibly manage each medium.

While the drive control apparatus according to the first embodiment is explained above, various modifications of the embodiment can be also implemented as the present invention. Various modifications (1) to (4) of the above embodiment are explained below as a second embodiment.

(1) Management of Medium Information

According to the first embodiment as described above, the medium information storage unit 42a stores information about whether encrypted data is stored in a medium, for each of the plural media stored in the tape library device, by relating this information to medium identification information (for example, a volume label) unique to each medium, thereby managing these pieces of related information. However, the present invention is not limited to this method, and as shown in FIG. 6, the information can be managed based on a storage position (for example, a column number) where each of the plural media is stored in the tape library device 30.

For each of the plural media stored in the tape library device, information about whether encrypted data is stored in a medium is stored by relating this information to each storage position. Therefore, each medium can be managed based on each storage position. FIG. 6 is a table of information stored in the medium information storage unit according to the second embodiment.

(2) Match Determination by the Server Device

In the first embodiment, the drive control apparatus 40 determines whether a combination of a medium specified by the client device 10 as an upper unit and a drive unit is appropriate. However, the present invention is not limited to this method, and the server device 20 can determine whether the combination is appropriate. The outline and characteristics of the server device 20, and the configuration of the server device 20 according to the second embodiment are sequentially explained below.

The server device 20 receives an instruction, containing information for assigning a medium and a drive unit onto which the medium is to be mounted, from the client device 10 as an upper unit. The server device 20 then confirms that the drive unit specified by the client device 10 is not being used. If the drive unit is not being used, the server device 20 transmits a signal to the drive control apparatus 40 to mount the medium onto this drive unit. On the other hand, if the drive unit is being used, the server device 20 replies to the client device 10 that the specified drive unit 1 is unusable.

As described above, the server device 20 confirms that the drive unit is not being used. Furthermore, the server device 20 determines whether the combination of the medium and the drive unit, specified in the instruction from the client device, is appropriate.

Specifically, the server device 20 repeatedly replies to the client device 10 that the drive unit is unusable until it receives the instruction to assign a drive unit for encrypted data to a medium storing encrypted data, or the instruction to assign a drive unit for unencrypted data to a medium storing unencrypted data. Therefore, it is possible to provide a tape library device in which both, drive units for encrypted data corresponding to media storing encrypted data and drive units for unencrypted data corresponding to media storing unencrypted data, are present.

Figure 7:
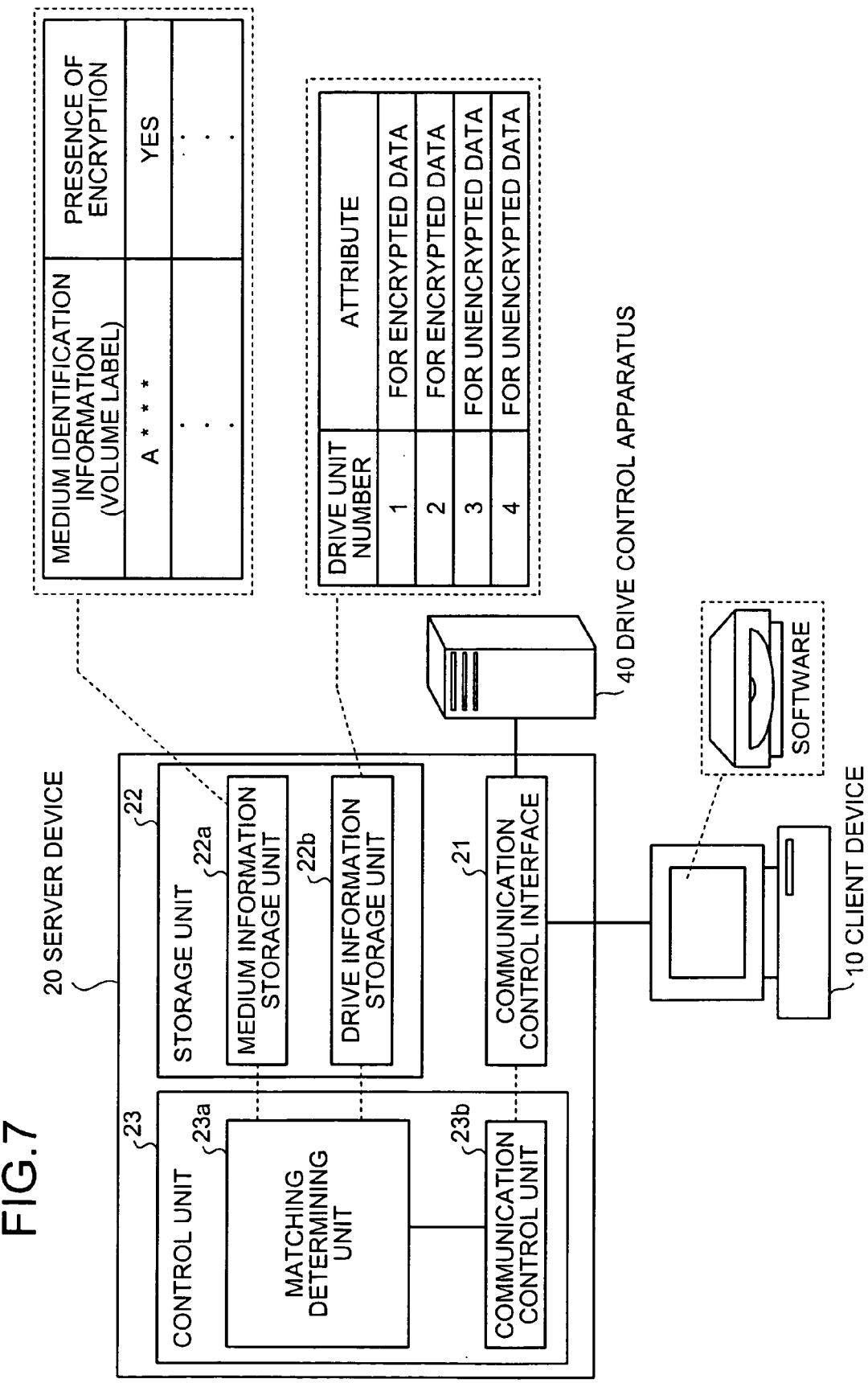
FIG. 7 is a block diagram of a configuration of a server device according to the second embodiment.

FIG. 7 is a block diagram of a configuration of a server device according to the second embodiment. As shown in FIG. 7, the server device 20 includes a communication control interface 21, a storage unit 22, and a control unit 23. The communication control interface 21 controls communication concerning various kinds of information exchanged between the client device 10 and the server device 20, or between the server device 20 and the drive control apparatus 40. Specifically, the communication control interface 21 receives an instruction containing information for assigning a medium and a drive unit onto which the medium is to be mounted, from the client device 10. The control unit 23 processes this information, and the communication control interface 21 relays a signal based on a result of this process, to the client device 10 and the drive control apparatus 40.

The storage unit 22 stores data and programs that are necessary for the control unit 23 to carry out various kinds of processes. Particularly, the storage unit 22 includes a medium information storage unit 22a, and a drive information storage unit 22b that are closely related to the present invention.

In the storage unit 22, the medium information storage unit 22a stores various kinds of information concerning media stored in the tape library device 30. Specifically, as shown in FIG. 7, the medium information storage unit 22a stores medium identification information (such as a volume label) that is unique to each medium, in relation to information about whether the medium stores encrypted data.

The drive information storage unit 22b stores various kinds of information concerning a drive unit. Specifically, as shown in FIG. 7, the drive information storage unit 22b stores a drive unit number that is unique to each drive unit, in relation to information about whether this drive unit corresponds to encrypted data or unencrypted data.

The control unit 23 includes internal memories for storing control programs of an operating system (OS) and programs that prescribe various process procedures, and executes various processes based on these programs. Particularly, as shown in FIG. 7, the control unit 23 includes a match determining unit 23a and a communication control unit 23b.

The match determining unit 23a determines whether the drive unit specified by the client device 10 is usable. That the drive unit is usable means the specified drive unit is unused, and that the combination of the medium and the drive unit onto which the medium is mounted, is appropriate. Specifically, the match determining unit 23a performs the determination in a similar manner to that of the drive control apparatus 40 in the first embodiment.

The communication control unit 23b receives a signal from the match determining unit 23a, and transmits predetermined information to the client device 10 and the drive control apparatus 40 via the communication control interface 21. Specifically, if it is confirmed that the drive unit specified by the client device 10 is being used, or if it is determined that the combination of the specified medium and the specified drive unit is not appropriate, the communication control unit 23b receives a signal from the match determining unit 23a, and replies to the client device 10 that the specified drive unit is unusable.

When the combination of the medium specified by the client device 10 and the specified drive unit is determined as appropriate, the communication control unit 23b transmits a signal to the drive control apparatus 40 to mount the specified medium onto the specified drive unit.

As described above, the server device 20 repeatedly replies to the client device 10 as an upper unit that the drive unit is unusable until it receives the instruction to assign a drive unit for encrypted data to a medium storing encrypted data, or the instruction to assign a drive unit for unencrypted data to a medium storing unencrypted data. Therefore, the tape library device 30 can mount an appropriate medium onto an appropriate drive unit, even when both, drive units for encrypted data and drive units for unencrypted data, are present.

In other words, based on the server device 20, it is possible to realize a tape library device in which both, drive units for encrypted data corresponding to media storing encrypted data and drive units for unencrypted data corresponding to media storing unencrypted data, are present. The reply from the server device 20 to the client device 10 that the specified drive unit cannot be used is the same as the signal sent from the conventional drive control apparatus to the client device 10 when the drive unit specified by the client device 10 is being used. Therefore, the above effect can be obtained without modifying the configuration of the client device 10. The drive control apparatus 40 directly executes the instruction for mounting a predetermined medium onto a predetermined drive unit, sent from the upper device, in a similar manner to the conventional practice. Therefore, the above effect can be obtained without modifying the configuration of the drive control apparatus 40.

According to the match determination by the server device in the description (2), the server device 20 confirms whether a drive unit specified by the client device 10 is being used, and determines whether the combination of the medium and the drive unit onto which the medium is to be mounted is appropriate. However, the present invention is not limited to this method. The drive control apparatus 40 can confirm whether the drive unit is being used, like the conventional practice, while the server device 20 only determines whether the combination of the medium and the drive unit onto which the medium is to be mounted is appropriate.

(3) Configurations of the Devices

The constituent elements of the drive control apparatus 40 shown in FIG. 2 and the server device 20 shown in FIG. 7 are only functional concepts, and do not always need to be physically configured as shown in the accompanying drawings. In other words, detailed modes of dispersion and integration of the drive control apparatus 40 are not limited to those shown in the drawings. For example, the match determining unit 44b and the communication control unit 44c can be integrated. Whole or a part of the constituent elements can be functionally or physically dispersed or integrated in optional units according to various loads and the status of use. In addition, all or an optional part of the various process functions performed by each unit can be realized by a central processing unit (CPU) or a program analyzed and executed by the CPU, or can be realized as hardware by wired logic.

(4) Drive Control Programs

Figure 8:
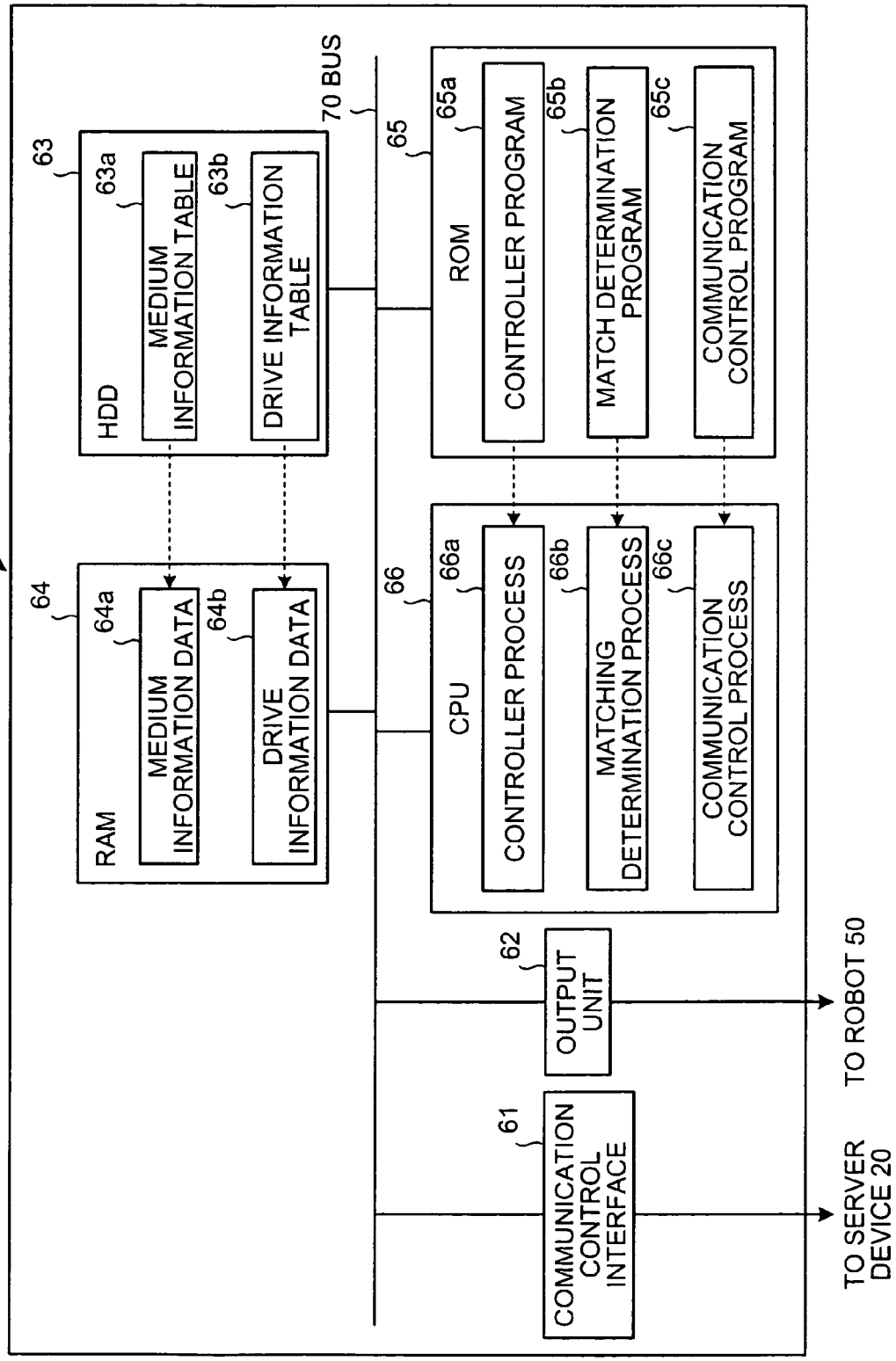
FIG. 8 is a diagram of a computer that executes drive control programs.

Various processes explained in the first embodiment can be programmed in advance, and a personal computer or a computer system such as a workstation can execute these programs to achieve required functions. One example that a computer executes drive control programs having functions similar to those of the first embodiment is explained below with reference to FIG. 8. FIG. 8 is an explanatory diagram of a computer that executes drive control programs.

As shown in FIG. 8, a computer 60 as a drive control apparatus includes a communication control interface 61, an output unit 62, a hard disk drive (HDD) 63, a random access memory (RAM) 64, a read-only memory (ROM) 65, and a CPU 66 that are connected to each other via a bus 70. The communication control interface 61 corresponds to the communication control interface 41 shown in FIG. 2, and the output unit 62 corresponds to the output unit 43.

Drive control programs that exhibit functions similar to those of the drive control apparatus 40 according to the first embodiment are stored in the ROM 65 in advance. In other words, a controller program 65a, a match determination program 65b, and a communication control program 65c are stored in the ROM 65 as shown in FIG. 8. These programs 65a, 65b, and 65c can be appropriately integrated or dispersed, like the constituent elements of the drive control apparatus 40 shown in FIG. 2.

The CPU 66 reads and executes the programs 65a, 65b, and 65c from the ROM 65, thereby enabling the programs 65a, 65b, and 65c to function as a controller process 66a, a match determination process 66b, and a communication control process 66c, respectively, as shown in FIG. 8. The processes 66a, 66b, and 66c correspond to the controller 44a, the match determining unit 44b, and the communication control unit 44c shown in FIG. 2 respectively.

The HDD 63 includes a medium information table 63a, and a drive information table 63b as shown in FIG. 8. The medium information table 63a and the drive information table 63b correspond to the medium information storage unit 42a and the drive information storage unit 42b shown in FIG. 2 respectively. The CPU 66 reads medium information data 64a and drive information data 64b from the medium information table 63a and the drive information table 63b respectively, stores these data into the RAM 64, and executes a match determination process, based on the medium information data 64a and the drive information data 64b stored in the RAM 64.

The programs 65a, 65b, and 65c need not be stored in the ROM 65 from the beginning, but can be stored in advance into a portable physical medium such as a flexible disk (FD), a compact disk read only memory (CD-ROM), a magneto-optic (MO) disk, a digital versatile disk (DVD), a magnetic optical disk, and an integrated circuit (IC) card that are inserted into the computer 60, a fixed physical medium such as an HDD provided internally or external to the computer 60, or other computers (or servers) connected to the computer 60 via a public line, the Internet, a local area network (LAN), and a wide area network (WAN). The computer 60 can read these programs from these mediums, and execute the programs.

According to the present invention, the drive control apparatus repeatedly replies to the upper unit that the drive unit is unusable until when the drive control apparatus receives the instruction to assign a drive unit for encrypted data to a medium storing encrypted data, or the instruction to assign a drive unit for unencrypted data to a medium storing unencrypted data. Therefore, the tape library device can mount an appropriate medium onto an appropriate drive unit, even when both, drive units for encrypted data and drive units for unencrypted data, are present.

In other words, based on the drive control apparatus, it is possible to realize a tape library device in which both, drive units for encrypted data corresponding to media storing encrypted data and drive units for unencrypted data corresponding to media storing unencrypted data, are present. The reply from the drive control apparatus to the upper unit that the specified drive unit cannot be used is the same as the signal that is sent from the conventional drive control apparatus to the upper unit when the drive unit specified by the upper unit is being used. Therefore, the above effect can be obtained without modifying the configuration of the upper unit.

Furthermore, according to the present invention, the drive control apparatus stores information about whether encrypted data is stored in a medium, for each of the plural media. Therefore, the media can be managed flexibly.

Furthermore, according to the present invention, the drive control apparatus stores information about whether encrypted data is stored in a medium, for each of the plural mediums, by relating this information to each information storage position in the tape library device. Therefore, the media can be managed for each storage position.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drive control apparatus that mounts a predetermined medium out of a plurality of media onto a predetermined drive unit out of a plurality of drive units, comprising:
    a receiving unit that receives, from an upper unit, an instruction to mount the predetermined medium onto the predetermined drive unit;
    a medium information storage unit that stores information indicating whether data stored in each of the media is encrypted;
    a drive information storage unit that stores information indicating whether each of the drive units corresponds to encrypted data;
    a match determining unit that determines whether a combination of a drive unit and a medium in an instruction from the upper unit is appropriate, wherein a combination of the drive unit and the medium both corresponding to encrypted data, and a combination of the drive unit and the medium both corresponding to unencrypted data are determined as appropriate; and
    a replying unit that replies to the upper unit that the predetermined drive unit cannot be used, if the match determining unit determines that the combination is inappropriate.

2. The drive control apparatus according to claim 1, wherein the medium information storage unit stores the information for each of the media.

3. The drive control apparatus according to claim 1, wherein the medium information storage unit stores the information for each storage position of each of the media.

4. A drive control method for mounting a predetermined medium out of a plurality of media onto a predetermined drive unit out of a plurality of drive units, comprising:
    receiving, from an upper unit, an instruction to mount the predetermined medium onto the predetermined drive unit;
    storing information indicating whether data stored in the medium is encrypted;
    storing information indicating whether the drive unit corresponds to encrypted data;
    determining whether a combination of a drive unit and a medium in an instruction from the upper unit is appropriate, wherein a combination of the drive unit and the medium both corresponding to encrypted data is determined as appropriate, and a combination of the drive unit and the medium both corresponding to unencrypted data is determined as appropriate; and
    replying to the upper unit that the predetermined drive unit cannot be used, if it is determined at the determining that the combination is inappropriate.

5. A computer-readable recording medium that stores therein a computer program for mounting a predetermined medium out of a plurality of media onto a predetermined drive unit out of a plurality of drive units, the computer program including instructions, which when executed, cause a computer to execute:
    receiving, from an upper unit, an instruction to mount the predetermined medium onto the predetermined drive unit;
    storing information indicating whether data stored in the medium is encrypted;
    storing information indicating whether the drive unit corresponds to encrypted data;
    determining whether a combination of a drive unit and a medium in an instruction from the upper unit is appropriate, wherein a combination of the drive unit and the medium both corresponding to encrypted data is determined as appropriate, and a combination of the drive unit and the medium both corresponding to unencrypted data is determined as appropriate; and
    replying to the upper unit that the predetermined drive unit cannot be used, if it is determined at the determining that the combination is inappropriate.

6. A server device comprising:
    a receiving unit that receives, from an upper unit, an instruction to mount a predetermined medium out of a plurality of media onto a predetermined drive unit out of a plurality of drive units;

a relaying unit that relays the instruction to a drive control apparatus;

a medium information storage unit that stores information indicating whether data stored in each of the media is encrypted;

a drive information storage unit that stores information indicating whether each of the drive units corresponds to encrypted data;

a match determining unit that determines whether a combination of a drive unit and a medium in an instruction from the upper unit is appropriate, wherein a combination of the drive unit and the medium both corresponding to encrypted data, and a combination of the drive unit and the medium both corresponding to unencrypted data are determined as appropriate;

a replying unit that replies to the upper unit that the predetermined drive unit cannot be used, if the match determining unit determines that the combination is inappropriate; and an instruction transmitting unit that transmits the instruction to the drive control apparatus, if the match determining unit determines that the combination is appropriate.

* * * * *